US012767460B2

(12) United States Patent

Saito

(10) Patent No.: US 12,767,460 B2

(45) Date of Patent: Oct. 20, 2026

(54) ROBOT AND WORKPIECE TRANSFER METHOD

(71) Applicant: KAWASAKI JUKOGYO KABUSHIKI KAISHA, Kobe (JP)

(72) Inventor: Masayuki Saito, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 391 days.

(21) Appl. No.: 18/024,499

(22) PCT Filed: Aug. 29, 2021

(86) PCT No.: PCT/JP2021/031629

§ 371 (c)(1),
(2) Date: Mar. 3, 2023

(87) PCT Pub. No.: WO2022/050203

PCT Pub. Date: Mar. 10, 2022

(65) Prior Publication Data

US 2024/0010444 A1 Jan. 11, 2024

(30) Foreign Application Priority Data

Sep. 4, 2020 (JP) ................................ 2020-148886

(51) Int. Cl.
*B65G 47/90* (2006.01)

(52) U.S. Cl.
CPC .................................... *B65G 47/90* (2013.01)

(58) Field of Classification Search
CPC ...... B25J 9/1641; B25J 9/1638; B25J 13/085; B25J 13/088
See application file for complete search history.

(56) References Cited

U.S. PATENT DOCUMENTS

| | | | | |
|---|---|---|---|---|
| 6,489,741 | B1 * | 12/2002 | Genov | B25J 9/163 318/566 |
| 2018/0286741 | A1 * | 10/2018 | Ueda | H01L 21/67766 |
| 2021/0253365 | A1 * | 8/2021 | Kodama | B65G 47/90 |
| 2022/0193897 | A1 * | 6/2022 | Shindo | B25J 13/088 |

FOREIGN PATENT DOCUMENTS

| | | | | |
|---|---|---|---|---|
| JP | 2000-6064 | A | | 1/2000 |
| JP | 2000006064 | A | * | 1/2000 |
| JP | 2000-216234 | A | | 8/2000 |
| JP | 2002-289673 | A | | 10/2002 |
| JP | 2006120861 | A | * | 5/2006 |

* cited by examiner

*Primary Examiner* — Saul Rodriguez
*Assistant Examiner* — Brendan P Tighe
(74) *Attorney, Agent, or Firm* — XSENSUS LLP

(57) ABSTRACT

A robot that transfers a workpiece includes an arm, a hand, a tilter, and a hand orientation controller. The hand is installed to the arm and holds the workpiece W on a top side of the hand and transfers it. The tilter tilts an orientation of the hand. The hand orientation controller tilts the orientation of the hand by the tilter when an acceleration is produced in the hand during a process of holing and transferring the workpiece by the hand so that a back side of the hand with respect to a direction of a horizontal component of the acceleration becomes higher than another.

17 Claims, 6 Drawing Sheets

ROBOT AND WORKPIECE TRANSFER METHOD

CROSS-REFERENCE TO RELATED APPLICATIONS

The present application is based on PCT filing PCT/JP2021/031629, filed Aug. 29, 2021, which claims priority to JP 2020-148886, filed Sep. 4, 2020, the entire contents of each are incorporated herein by reference.

TECHNICAL FIELD

The present disclosure chiefly relates to a robot that transfers workpieces, such as semiconductor wafers and printed circuit boards.

BACKGROUND ART

Conventionally, there has been a known robot for transferring a workpiece. PTL 1 discloses a transfer apparatus comprising a transfer robot of this type.

The transfer robot of PTL 1 includes a body and an arm. The arm is installed to an upper portion of the body. The transfer robot transfers a substrate (a workpiece) between a cassette and a processing apparatus or the like by extending and retracting the arm. An end effector that holds the substrate is installed to an end of the arm.

PRIOR-ART DOCUMENTS

Patent Documents

PTL 1: Japanese Patent Application Publication No. 2006-120861

SUMMARY OF THE INVENTION

Problems to be Solved by the Invention

With the transfer robot, such as that with the configuration disclosed in PTL 1, however, the substrate held by the end effector and placed on the end effector may be affected by inertia and misaligned with the end effector when the arm starts moving the end effector after the substrate is placed on the end effector. When this misalignment occurs, for example, the transfer robot could not accurately pass the substrate stored in the cassette to the processing apparatus or the like. This conventional configuration has been desired to be improved in this respect.

The present disclosure is made in view of the situation described above, and its purpose is to provide a robot that can control a misalignment of a workpiece when transferring it.

Means for Solving the Problems

The problem to be solved by the present disclosure is as described above. The means to solve this problem and the effects thereof will be described below.

A first aspect of the present disclosure provides a robot with a configuration described below. That is, a robot that transfers a workpiece includes an arm, a hand, a tilter, and a hand orientation controller. The hand is installed to the arm and holds the workpiece on a top side of the hand and transfers it. The tilter tilts an orientation of the hand. The hand orientation controller tilts the orientation of the hand by the tilter when an acceleration is produced in the hand during a process of holding and transferring the workpiece by the hand so that a back side of the hand with respect to a direction of a horizontal component of the acceleration becomes higher than another.

A second aspect of the present disclosure provides a workpiece transfer method as follows. That is, in this workpiece transfer method, a robot that includes an arm, a hand, and a tilter transfers the workpiece. The hand is installed to the arm and holds the workpiece on a top side of the hand and transfers it. The tilter tilts an orientation of the hand. An orientation of the hand is tilted by the tilter when an acceleration is produced in the hand during a process of holding and transferring the workpiece by the hand so that a back side of the hand with respect to a direction of a horizontal component of the acceleration becomes higher than another.

A third aspect of the present disclosure provides a robot with a configuration described below. That is, a robot that transfers a workpiece includes an arm, a hand, a tilter, and a hand orientation controller. The hand is installed to the arm and holds the workpiece on a bottom side of the hand and transfers it. The tilter tilts an orientation of the hand. The hand orientation controller tilts the orientation of the hand by the tilter when an acceleration is produced in the hand during a process of holding and transferring the workpiece by the hand so that a front side of the hand with respect to a direction of a horizontal component of the acceleration becomes higher than another.

A fourth aspect of the present disclosure provides a workpiece transfer method as follows. That is, in this workpiece transfer method, a robot that includes an arm, a hand, and a tilter transfers the workpiece. The hand is installed to the arm and holds the workpiece on a bottom side of the hand and transfers it. The tilter tilts an orientation of the hand. An orientation of the hand is tilted by the tilter when an acceleration is produced in the hand during a process of holding and transferring the workpiece by the hand so that a front side of the hand with respect to a direction of a horizontal component of the acceleration becomes higher than another.

In these manners, an inertial force that acts on the workpiece due to a motion of the hand with an acceleration is partly absorbed by the hand that is tilted. Therefore, even when the workpiece is transferred at high speed, the workpiece is less likely to be misaligned with the hand and a smooth transfer is achieved.

Effects of the Invention

According to the present disclosure, a substrate transfer robot designed to control a misalignment of a workpiece during transfer is provided.

EMBODIMENT FOR CARRYING OUT THE INVENTION

Figure 1:
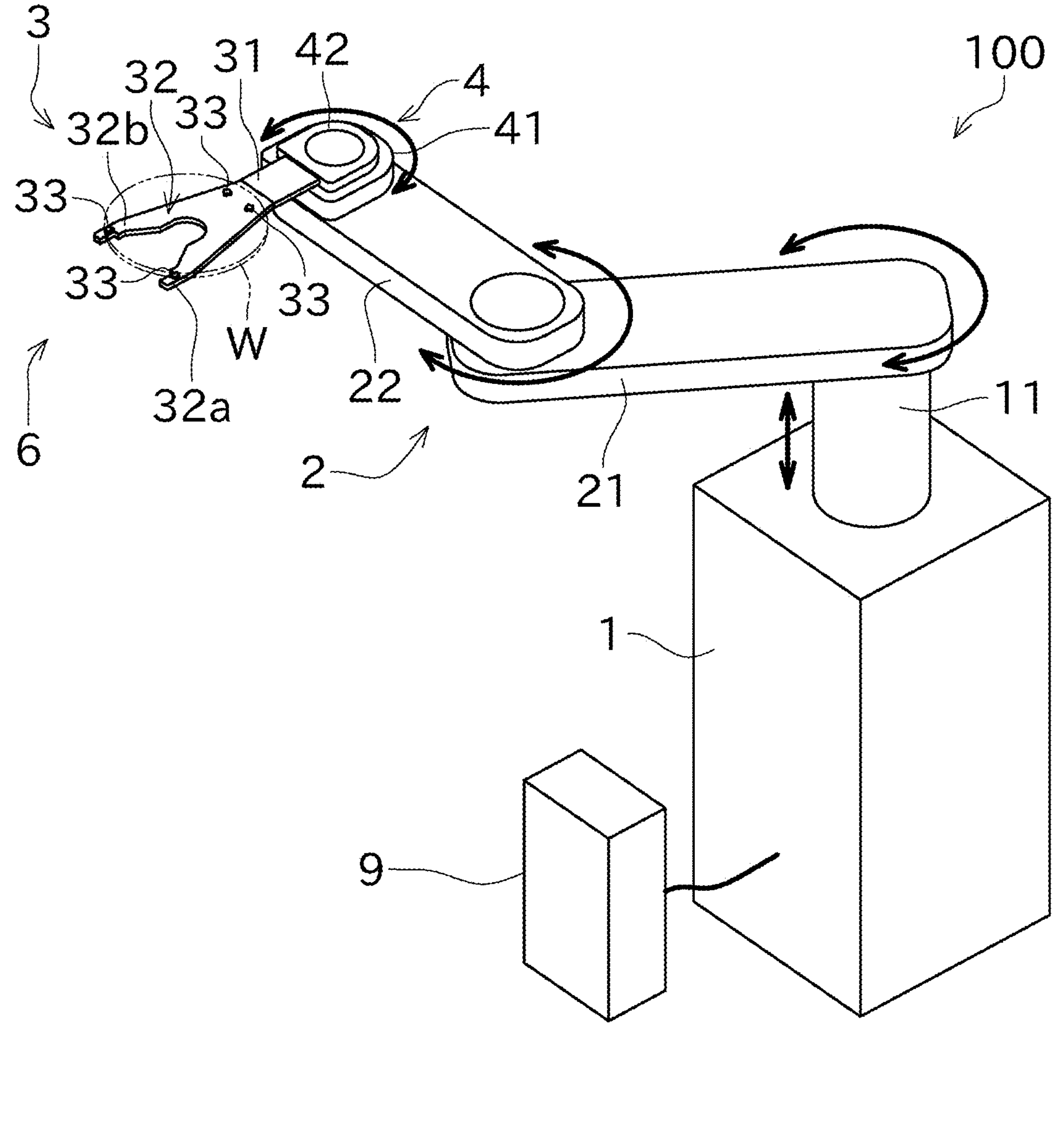
FIG. 1 is a perspective view showing an overall configuration of a robot according to a first embodiment of the present disclosure.

The disclosed embodiments will be described below with reference to the drawings. FIG. 1 is a perspective view showing an overall configuration of a robot 100 according to a first embodiment of the present disclosure.

The robot 100 shown in FIG. 1 is installed, for example, in a plant for the manufacture of a workpiece W, such as a semiconductor wafer or a printed circuit board, or in a warehouse for storing the workpiece W. The robot 100 is used to transfer the workpiece W between multiple positions. When the workpiece W is a substrate, it may be any of the following: a raw material for a substrate, a semi-finished product in process, or a finished product. The workpiece W is disc-shaped in the present embodiment, but is not limited to this. The workpiece W may also be another object, such as a dish or a tray.

The robot 100 chiefly includes a base 1, a robot arm (an arm) 2, a robot hand (a hand) 3, a tilter 4, and a robot controller (a hand orientation controller) 9.

The base 1 is fixed to a floor of a factory or the like. Note, however, that the base 1 may also be fixed to, for example, a processing facility, without limitation. The base 1 may also be fixed to a member that is movable in a horizontal direction.

As shown in FIG. 1, the robot arm 2 is installed to the base 1 with a lifting shaft 11 that can move in the vertical direction installed between them. The robot arm 2 can rotate with respect to the lifting shaft 11.

The robot arm 2 includes a horizontal articulated robot arm. The robot arm 2 includes a first arm 21 and a second arm 22.

The first arm 21 is comprised of an elongated member extending in a horizontal direction. One end of the first arm 21 in the lengthwise direction is installed to the upper end of the lifting shaft 11. The first arm 21 is rotatably supported to rotate around the (vertical) axis of the lifting shaft 11. The second arm 22 is installed to the other end of the first arm 21 in the lengthwise direction.

The second arm 22 is comprised of an elongated member extending in a horizontal direction. One end of the second arm 22 in the lengthwise direction is installed to the distal end of the first arm 21. The second arm 22 is rotatably supported to rotate about an (vertical) axis parallel to the lifting shaft 11. The robot hand 3 is installed to the other end of the second arm 22 in the lengthwise direction.

Each of the lifting shaft 11, the first arm 21 and the second arm 22 is driven by a suitable actuator, not shown in the drawings. These actuators may be, for example, electric motors.

Arm joints are located between the lifting shaft 11 and the first arm 21, between the first arm 21 and the second arm 22, and between the second arm 22 and the robot hand 3. An encoder, not shown in the drawings, is installed at each arm joint and detects rotational position of each of the first arm 21, the second arm 22 and the robot hand 3. Also, at an appropriate location on the robot 100, an encoder that detects changes in the position of the first arm 21 in the height direction (i.e., an amount of lift of the lifting shaft 11) is installed.

Based on positional information of the first arm 21, the second arm 22, or the robot arm 3 including information about their rotational position or vertical position detected by the corresponding encoder, the robot controller 9 controls the operation of the electronic motors that each drive one of the lifting shaft 11, the first arm 21, the second arm 22, and the robot hand 3. In the following description, the term "positional information" detected by the encoders shall mean a combination of positional information detected by each encoder that represents the pose of the robot 100.

The robot hand 3 includes a wrist 31 and a hand body 32, as shown in FIG. 1.

The wrist 31 is attached to the distal end of the second arm 22 with a tilter 4 installed between them. The wrist 31 is rotatably supported to rotate about an (vertical) axis parallel to the lifting shaft 11. Note, however, that the axis of rotation of the wrist 31 can be tilted with respect to a line parallel to the lifting shaft 11 by using the tilter 4. The configuration of the tilter 4 is described in detail below. The wrist 31 is rotationally driven by a suitable actuator that is not shown in the drawings. This actuator may be, for example, an electric motor. The hand body 32 is connected to the wrist 31. The wrist 31 and the hand body 32 may be provided as one integrally formed member.

The hand body 32 is a member that acts in order to hold the workpiece W. The hand body 32 includes a plate-like member formed in a Y-shape (or a U-shape). One end portion of the hand body 32 which is not connected to the wrist 31 (in other words, the distal portion) is split in two. In the following description, each of the bifurcated portions may be referred to as a first finger 32*a* and a second finger 32*b*.

The first finger 32*a* and the second finger 32*b* are formed to be symmetrical with each other. As shown in the drawings, such as FIG. 4, a suitable distance is formed between the tips of the first finger 32*a* and the second finger 32*b*.

More than one guide member 33 for holding the workpiece W is installed both on the distal portion and on the proximal portion of the hand body 32 of the present embodiment. The guide members 33 are comprised of, for example, rubber. The guide members 33 are installed to project upward from the hand body 32, which is a plate-like member. For example, as shown in FIG. 1, one guide member 33 is installed on each of the first finger 32*a* and the second finger 32*b*, and two guide members 33 are installed on the proximal end portion of the hand body 32.

Figure 4:
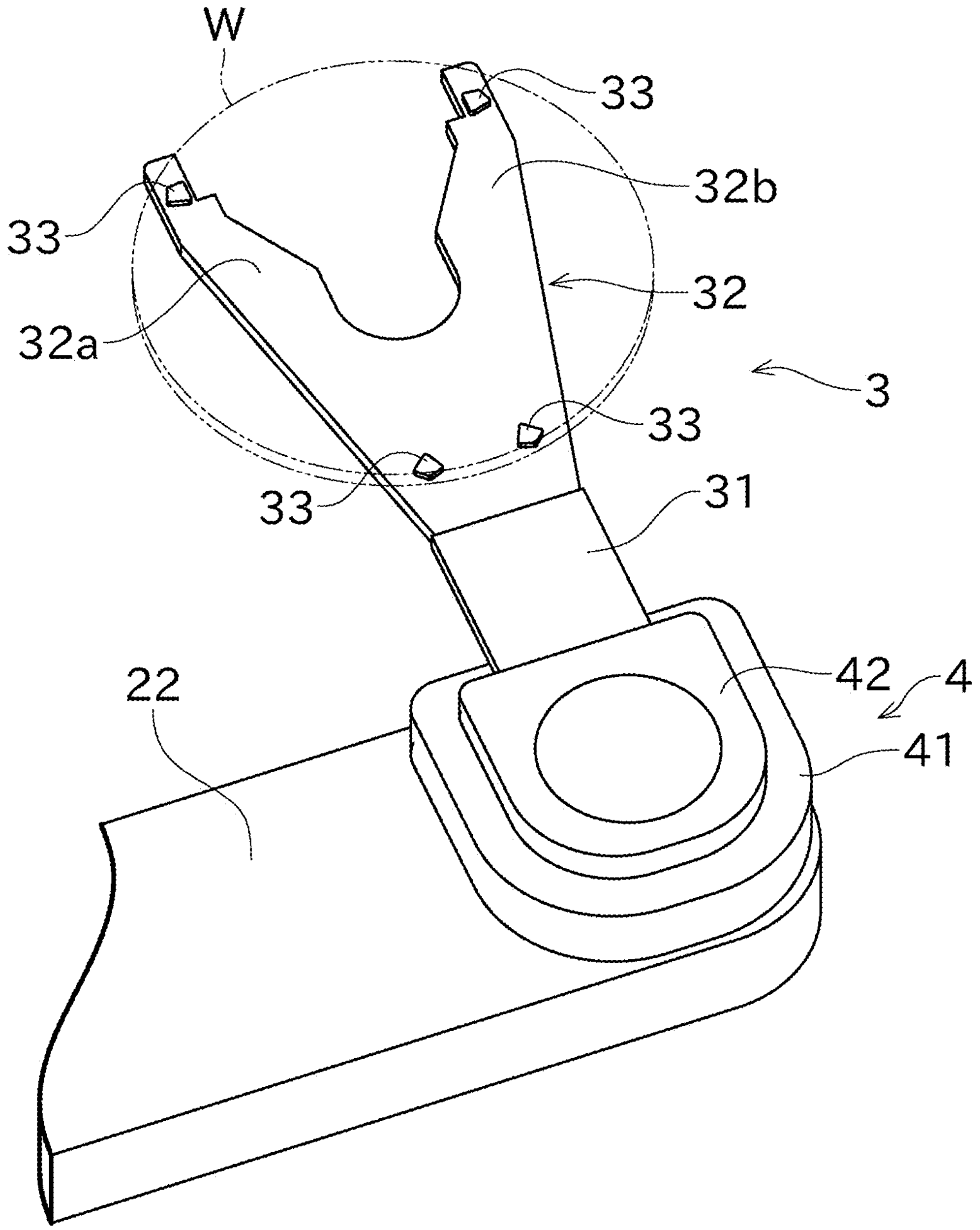
FIG. 4 is an enlarged perspective drawing showing a detailed configuration of guide members.

As shown in FIG. 4, the guide members 33 contact portions of the bottom surface of the workpiece W close to its rim and they hold the workpiece W placed on the robot hand 3. The guide members 33 only support the workpiece W from below by contacting the bottom surface of the workpiece W. In other words, the guide members 33 do not grip the edge of the workpiece W from the outside of the workpiece W in the radial direction. A static friction between surfaces of the workpiece W and the guide members 33 keeps the workpiece W still preventing the workpiece W from moving parallel to the robot hand 3 and being misaligned with the robot hand 3.

The configuration of the robot hand 3 to hold the workpiece W is not limited to the configuration described above. The robot hand 3 may hold the workpiece W by, for example, a structure that suctions the bottom surface of the workpiece W with negative pressure. For example, the robot hand 3 may be equipped with a known Bernoulli chuck to hold the workpiece W in a non-contact manner.

The tilter 4 is installed to the distal portion of the second arm 22 (to the end portion opposite to the other end portion connected to the first arm 21).

Figure 2:
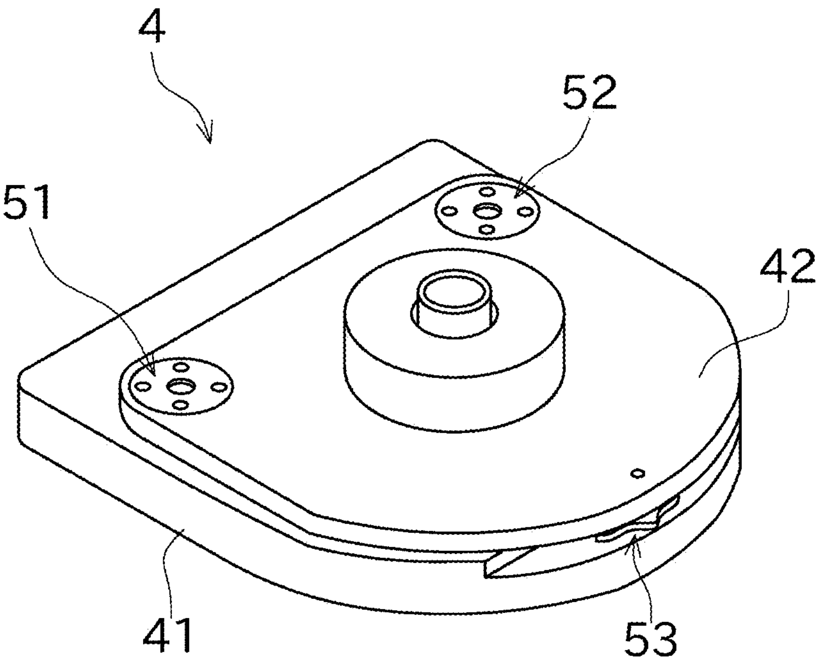
FIG. 2 is a perspective view showing an example of a tilter.

The tilter 4 includes a bottom plate 41 and the top plate 42 as shown in FIG. 2. The bottom plate 41 is fixed to the top surface of the second arm 22. The top plate 42 rotatably supports the wrist 31 of the robot hand 3. A height adjuster 5 is located between the bottom plate 41 and the top plate 42. The tilter 4 adjusts the angle and direction of a tilt of the top plate 42 with respect to the bottom plate 41 by using this height adjuster 5.

Figure 3:
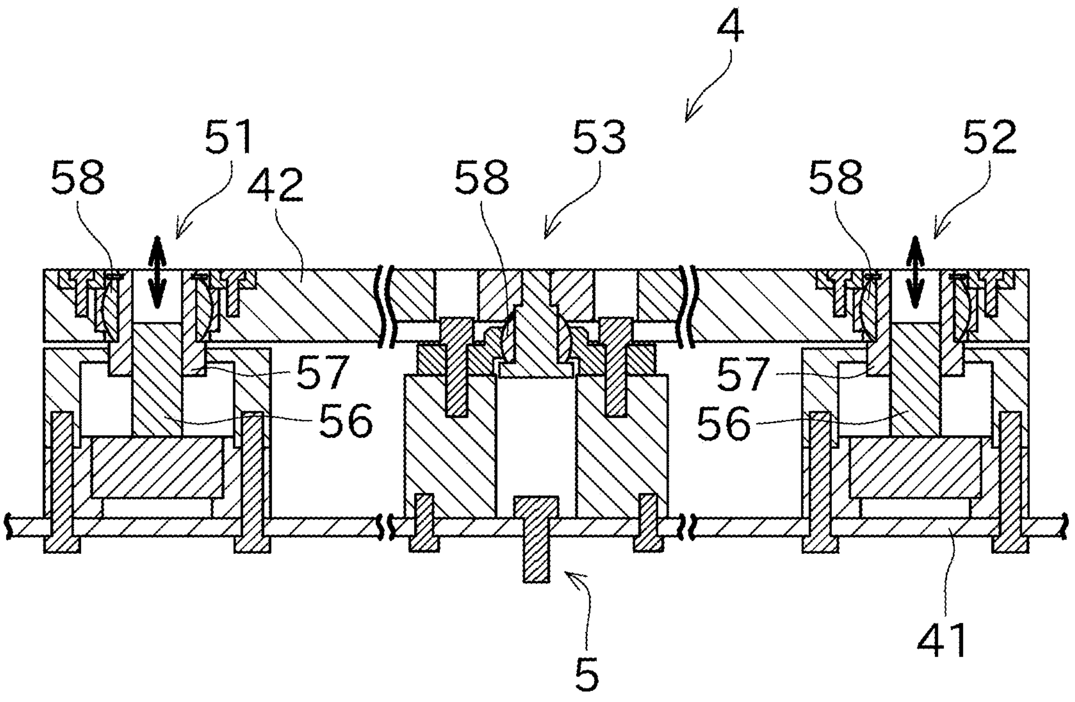
FIG. 3 is a cross-sectional view showing an example of a tilter.

The height adjuster 5 includes, for example, three supports 51, 52, 53 arranged at different positions between the bottom plate 41 and the top plate 42 as shown in FIG. 2. In FIG. 3, for convenience of explanation, the supports 51, 52, and 53 are drawn as they are positioned in a straight line, but in actuality, as shown in FIG. 2, they are arranged to form a triangle in a plan view.

Each of the supports 51 and 52 includes an externally threaded member 56, an internally threaded member 57, and a spherical bearing 58. The threaded shafts of the externally threaded members 56 are rotatably supported by the bottom plate 41 with their axes pointing in a vertical direction. Actuators (for example, electric motors), that are not shown in the drawings, can separately rotate each of these threaded shafts arranged in the two supports, 51 and 52. Each of the internally threaded members 57 is coupled with the threaded shaft of the corresponding externally threaded member 56. When the threaded shaft is rotated, the corresponding internally threaded member 57 moves in a vertical direction. This movement allows the height at which the supports 51 and 52 support the top plate 42 to be changed. The spherical bearings 58 are located between the internally threaded members 57 and the top plate 42.

A spherical bearing 58 is arranged at the support 53. The support 53 does not have such function to change the height of support by using threads.

With the electric motors driven, the supports 51 and 52 independently change the height of the top plate 42 with respect to the bottom plate 41. In this manner, the angle and the direction of the tilt of the top plate 42 with respect to the bottom plate 41 are changed. As a result, the orientation (the angle and direction of the tilt) of the robot hand 3 with respect to the second arm 22 is adjusted. Note that, the configuration of the height adjuster (and thus the tilter 4) is not limited to this configuration described above.

The robot controller 9 stores results of detection made by the encoders corresponding to the orientation of the robot hand 3 as information about the orientation of the robot hand 3. In this manner, the robot controller 9 can replicate the orientation of the robot hand 3 as memorized by controlling the electric motors that drive elements of the robot 100 (such as the lifting shaft 11, the first arm 21, the second arm 22, and the robot hand 3) in order to match results of detection made by the encoders that detect an orientation of the robot hand 3 to the stored information about the orientation of the robot hand 3.

As shown in FIG. 1, the robot controller 9 is arranged separately from the base 1. Note, however, that the robot controller 9 may be arranged inside the base 1. The robot controller 9 is configured as a known computer and includes a processing unit, such as a microcontroller, a CPU, a MPU, a PLC, a DSP, an ASIC or a FPGA, a memory unit, such as a ROM, a RAM or a HDD, and a communication unit that can communicate with an external apparatus. The memory unit stores a program to be executed by the processing unit, various thresholds, or the like. The communication unit is configured to transmit results of the detection made by various sensors (for example, the mapping sensor 6 and the encoders) to the external apparatus and to receive the information about the workpiece W or the like from the external apparatus.

The robot controller 9 can control the tilter 4 along with the lifting shaft 11, the robot arm 2, and the robot hand 3.

The robot 100 holds the workpiece W on the top side of the robot hand 3 and transfers it. When the robot hand 3 transfers the workpiece W between different positions, it is inevitable that an acceleration is produced in the robot hand 3. It is well known that in a coordinate system in a motion with an acceleration, an inertial force that is opposite in direction to the acceleration acts on an object. When the robot hand 3 is horizontal and in a horizontal motion with an acceleration, the above mentioned inertial force acts on the workpiece W so that the workpiece W is horizontally moved and becomes misaligned with the robot hand 3.

Due to the recent need for high-speed transfer, the acceleration produced in the robot hand 3 is becoming greater and the inertial force acts on the workpiece W is becoming correspondingly greater. Since the guide members 33 only contact the bottom surface of the workpiece and hold the workpiece W by the friction, they do not always strongly hold the workpiece W. Therefore, the workpiece W is easily misaligned with the robot hand 3.

Figure 5:
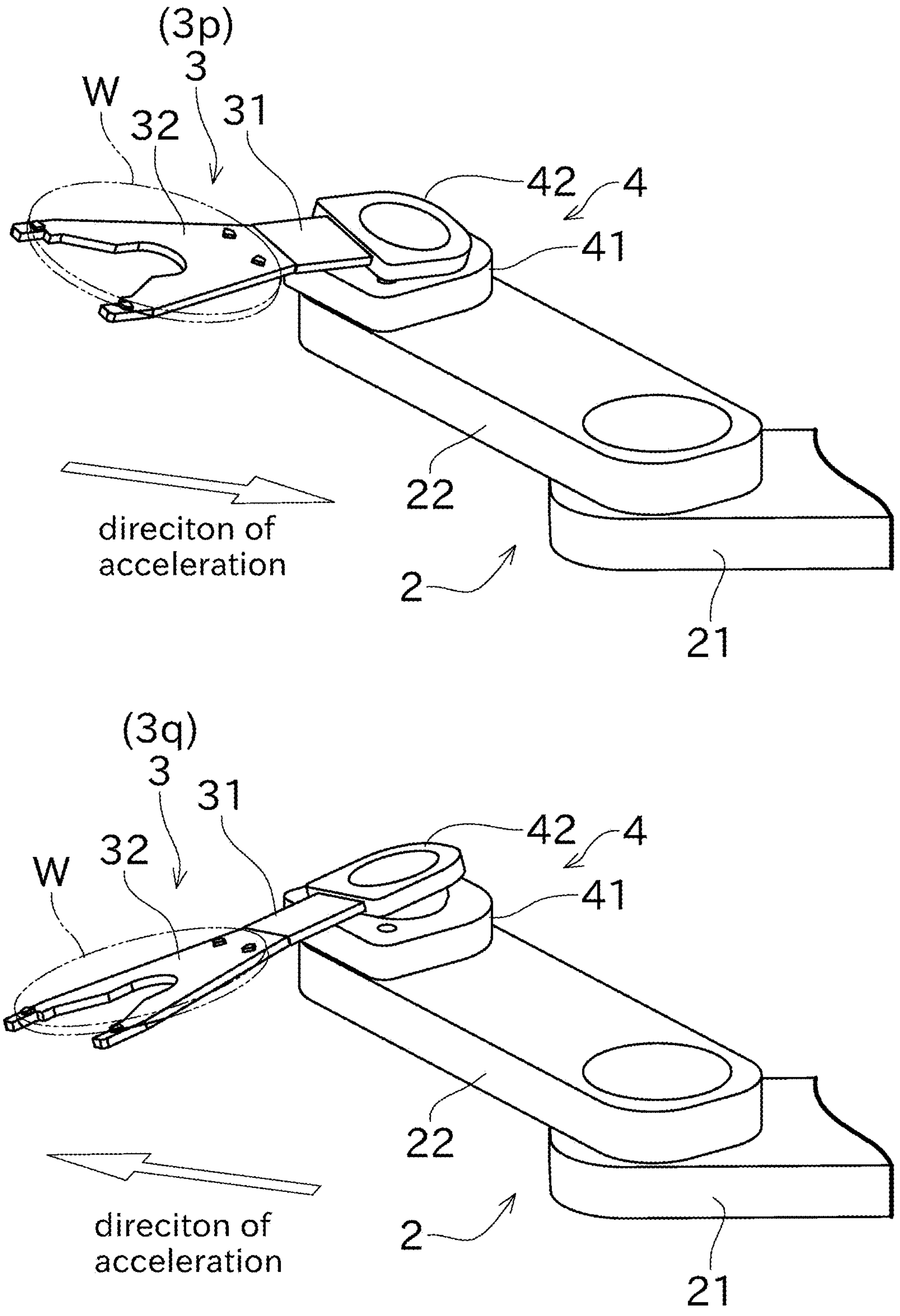
FIG. 5 is a perspective view illustrating a relationship between a motion of a robot hand with an acceleration and an orientation of the robot hand.

In this respect, in the present embodiment, when the robot hand 3 is a motion with an acceleration, the robot controller 9 controls the tilter 4 to tilt an orientation of the robot hand 3 so that the back side of the robot hand 3 with respect to the direction of the acceleration (in detail, the direction of the horizontal component of the acceleration) becomes higher than the other. FIG. 5 illustrates two examples of a relationship between an acceleration of the robot hand 3 and a corresponding tilt (3*p*, 3*q*) of the robot hand 3. Since the tilter 4 can tilt the robot hand 3 in any direction, it can respond to accelerations in any direction that may be produced in the robot hand 3.

In this manner, the inertial force that acts on the workpiece W is partly absorbed by the robot hand 3 with its orientation controlled corresponding to the acceleration. As a result, a misalignment of the workpiece W is effectively prevented.

The robot hand 3 should be tilted more greatly when the acceleration in the robot hand 3 is large than when it is small. The misalignment of the workpiece W is prevented precisely, that is, without exceed or deficiency, by increasing the degree of the absorption of the inertial force by the robot hand 3 according to the magnitude of the inertial force.

To more precisely prevent a misalignment of the workpiece W, it is preferable to tilt the robot hand 3 more greatly when a coefficient of friction of the workpiece W is small, compared to when it is large. In this configuration, the robot controller 9 acquires the coefficient of friction of the workpiece W from an external apparatus in advance via the communication unit and stores it in the memory unit. The robot controller 9 then changes the amount of tilt of the robot hand 3 according to the coefficient of friction of the workpiece W when controlling the robot hand 3.

Figure 6:
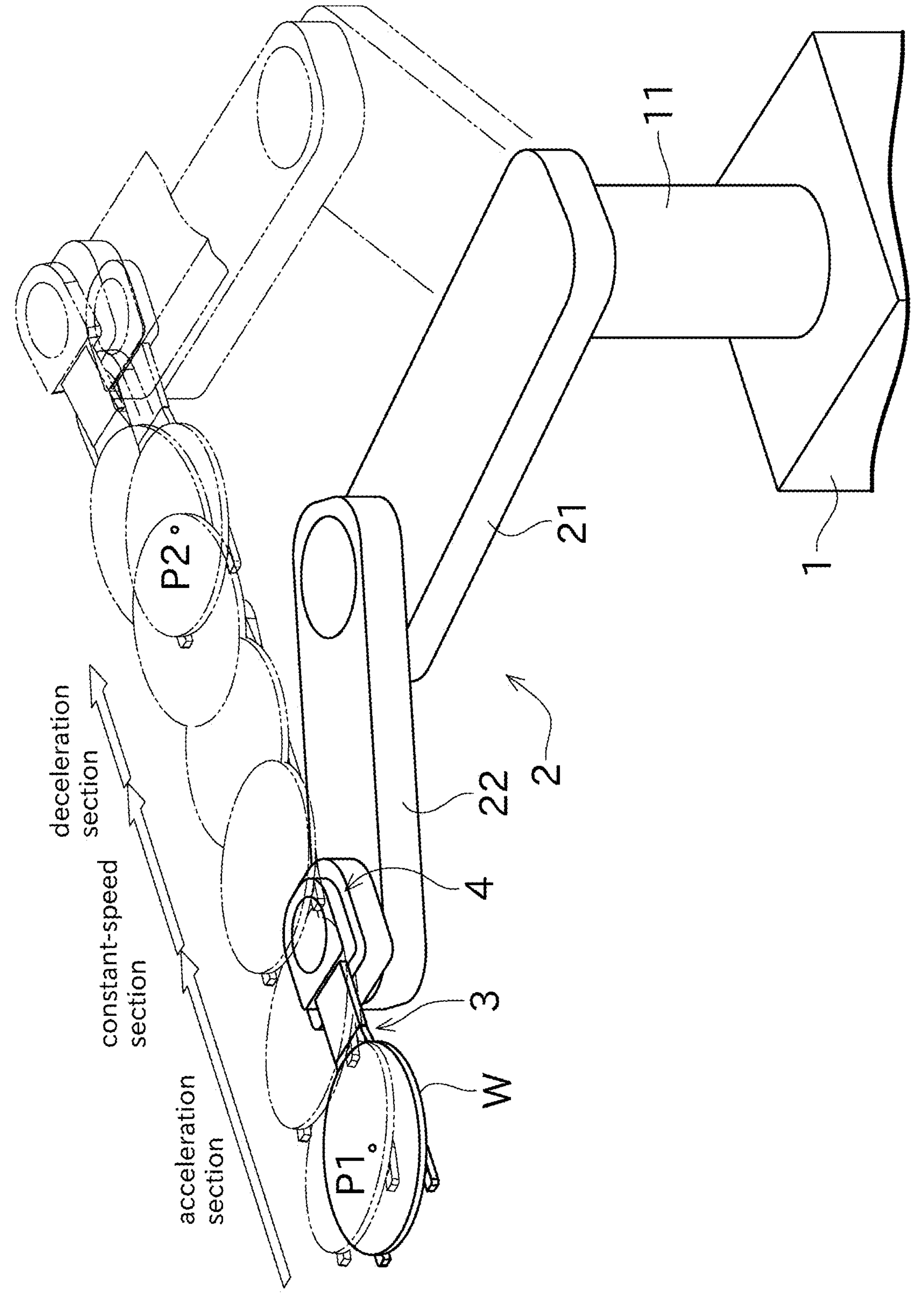
FIG. 6 is a perspective view illustrating how an orientation of a robot hand is controlled when it transfers a substrate between two points.

FIG. 6 illustrating how the orientation of the robot hand 3 changes when it transfers the workpiece W along a linear path from a first point P1 to a second point P2. In the example shown in FIG. 6, the first point P1 and the second point P2 are different points in a plan view, but they are located at the same height. The workpiece W is transferred along a substantially horizontal path from the first point P1 and the second point P2. Therefore, the acceleration in the robot hand 3 is produced only in a horizontal direction.

Immediately after the robot hand 3 departs from the first point P1, an acceleration in a direction from the first point P1 to the second point P2 is produced in the robot hand 3. While the robot hand 3 is passing through this acceleration section, the robot controller 9 tilts the robot hand 3 so that the back side of the robot hand 3 with respect to the direction of the transfer becomes higher. Therefore, the workpiece W is prevented from being left behind by the robot hand 3 and misaligned.

When the speed of the robot hand 3 reaches a predetermined speed, the robot hand 3 stops accelerating and starts moving at a constant speed. While the robot hand 3 is passing through this constant-speed section, the robot controller 9 adjusts the orientation of the robot hand 3 so that it becomes horizontal.

As the robot hand 3 approaches the second point P2, an acceleration in a direction from the second point P2 to the first point P1 is produced in the robot hand 3. While the robot hand 3 is passing through this deceleration section, the robot controller 9 tilts the robot hand 3 so that the front side of the robot hand 3 with respect to the direction of the transfer becomes higher. Therefore, the workpiece W is prevented from travelling too far and being misaligned with the robot hand 3.

In these manners, in the present embodiment, a misalignment between the workpiece W and the robot hand 3 is prevented from occurring during the process of the transfer. As a result, a stable transfer of the workpiece W is achieved.

As described above, in the present embodiment, the robot 100 for transferring the workpiece W includes the robot arm 2, the robot hand 3, the tilter 4, and the robot controller 9. The robot hand 3 is installed to the robot arm 2 and holds the workpiece W on the top side of the robot hand 3 and transfers it. The tilter 4 can tilt an orientation of the robot hand 3 in any direction. The robot controller 9 tilts the orientation of the robot hand 3 by the tilter 4 when an acceleration is produced in the robot hand 3 during the process of holding and transferring the workpiece W by the robot hand 3 so that the back side of the robot hand 3 with respect to the direction of the horizontal component of the acceleration becomes higher than the other.

In this manner, an inertial force that acts on the workpiece W due to the motion of the robot hand 3 with the acceleration is partly absorbed by the tilted robot hand 3. Therefore, even when the workpiece W is transferred at high speed, the workpiece W is less likely to be misaligned with the robot hand 3 and a smooth transfer is achieved.

In the robot 100 of the present embodiment, the robot controller 9 tilts the robot hand 3 more greatly when the horizontal component of the acceleration produced in the robot hand 3 is large than when it is small.

In this manner, the misalignment of the workpiece W is precisely prevented by adjusting the magnitude of the tilt of the robot hand 3 according to the magnitude of the inertial force acts on the workpiece W.

In the present embodiment, when the workpiece is transferred from the first point P1 to the second point P2 which is a different point in a plan view from the first point P1, the robot controller 9 tilts the robot hand 3 so that the back side of the robot hand 3 with respect to the direction of the transfer becomes higher at a moment immediately after the robot hand 3 starts transferring the workpiece W from the first point P1. The robot controller 9 also tilts the robot hand 3 so that the front side of the robot hand 3 with respect to the direction of the transfer becomes higher at a moment immediately before the robot hand 3 reaches the second point P2.

In these manners, a misalignment of the workpiece W with the robot hand 3 is prevented at the moment of departure from the first point P1 and at the moment of arrival at the second point P2, and a smooth transfer of the workpiece W is achieved.

In the robot 100 of the present embodiment, the robot hand 3 acts only on the bottom surface of the workpiece W to hold it on the top side of the robot hand 3.

That is, the configuration of the present embodiment, in which the inertial force that acts on the workpiece W is partly absorbed by tilting the robot hand 3, is suitable for a configuration in which the robot hand 3 acts only on the bottom surface of the workpiece W to hold it (in other words, a configuration in which it is difficult to strongly grip the workpiece W with a force parallel to the robot hand 3.).

Next, a robot of a second embodiment will be explained below. In the description of the second embodiment, the same or similar components as that of the above-described embodiment may be marked with the same references in the drawings and the description thereof may be omitted.

The robot of the present embodiment differs from the robot 100 of the first embodiment in that the robot hand 3 holds the workpiece W on the bottom side of the robot hand 3 and transfers it.

Figure 7:
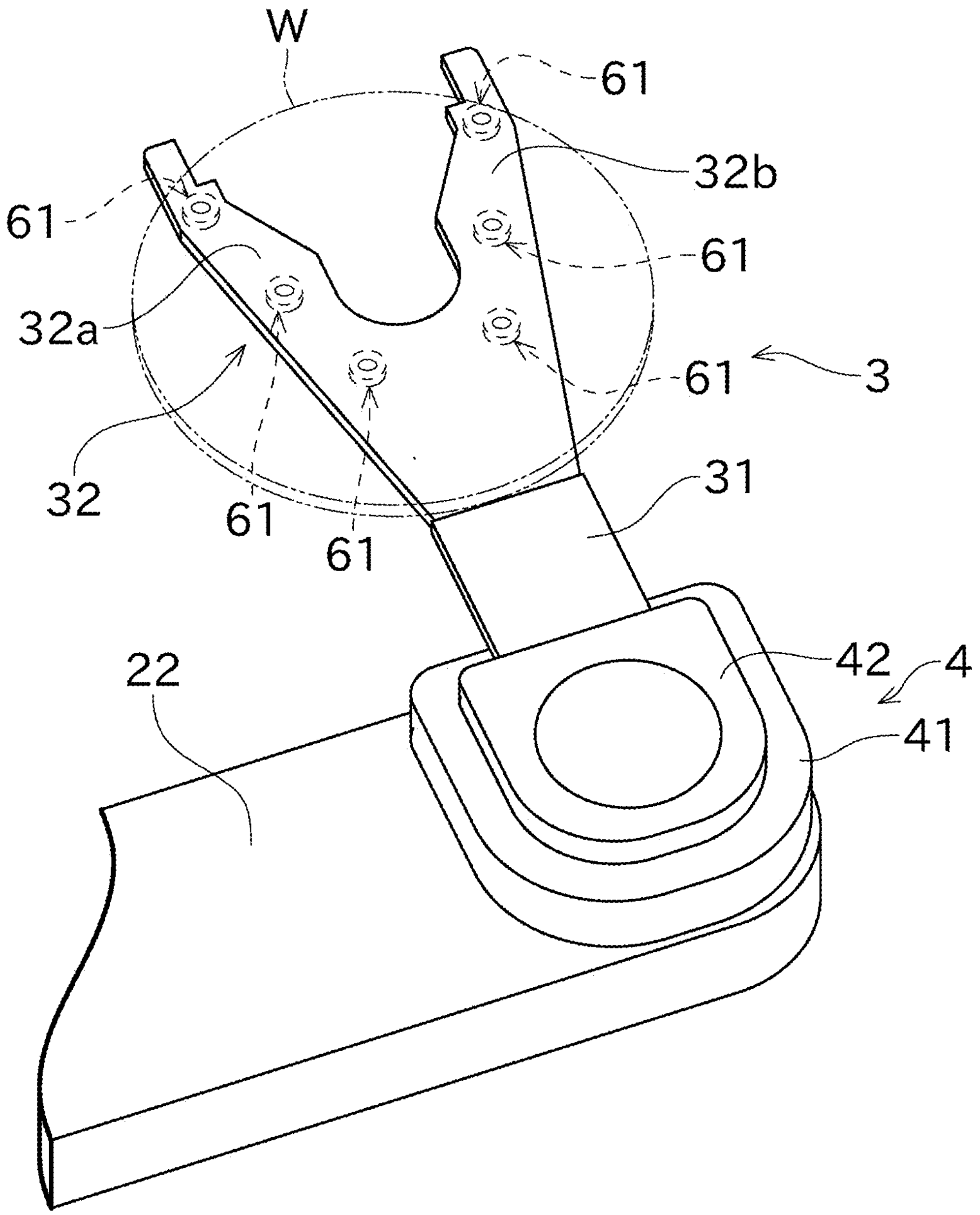
FIG. 7 is an enlarged perspective drawing showing a configuration of a robot hand of a robot according to a second embodiment of the present disclosure.

As shown in FIG. 7, known Bernoulli chucks 61 are installed to the bottom surface of the robot hand 3. The workpiece W is held below the bottom surface of the robot hand 3 in a non-contact manner and kept held during the transfer of the workpiece W by using these Bernoulli chucks 61. The configuration for holding the workpiece W below the bottom surface of the robot hand 3 is not limited to any particular configuration and may be any configuration, such as that in which the workpiece W is held by suction.

When the robot hand 3 starts a motion with an acceleration with the workpiece W held below the bottom surface of the robot hand 3, the robot controller 9 controls the tilter 4 to tilt an orientation of the robot hand 3 so that the front side of the robot hand 3 with respect to the direction of the acceleration (in detail, the direction of the horizontal component of the acceleration) becomes higher than the other. That is, in the present embodiment, which side of the hand robot 3 with respect to the direction of the acceleration is tilted, the front side or the back side, is opposite to the first embodiment because the workpiece W is held on the opposite side of the robot hand 3 compared to the first embodiment.

As described above, the robot of the present embodiment includes the robot arm 2, the robot hand 3, the tilter 4, and the robot controller 9. The robot hand 3 is installed to the robot arm 2 and holds the workpiece W below the bottom surface of the robot hand 3 and transfers it. The tilter 4 tilts the orientation of the robot hand 3. The robot controller 9 tilts the orientation of the robot hand 3 by the tilter 4 when an acceleration is produced in the robot hand 3 during the process of holding and transferring the workpiece W by the robot hand 3 so that the front side of the robot hand 3 with respect to the direction of the acceleration becomes higher than the other.

In this manner, an inertial force that acts on the workpiece W due to the motion of the robot hand 3 with the acceleration is partly absorbed by the tilted robot hand 3. Therefore, even when the workpiece W is transferred at high speed, the workpiece W is less likely to be misaligned with the robot hand 3 and a smooth transfer is achieved.

While the preferred embodiments of the present disclosure have been described above, the configurations described above may be modified as follows, for example.

In the example illustrated by FIG. 6, the workpiece W is transferred in a horizontal direction, but the heights of the first point P1 and the second point P2 may be different from each other. In this case, the acceleration produced in the robot hand 3 comprises a vertical component. Note, however, that the orientation of the robot hand 3 may be controlled focusing only on the horizontal component of the acceleration produced in the robot hand 3.

The workpiece W may be transferred along a path, for example, that is not straight as shown in FIG. 6 but partly curved. In this case, even when the workpiece W is transferred at constant speed, it is preferable to tilt the robot hand 3 as necessary in order to absorb an inertial force (in other words, a centrifugal force) while the robot hand 3 is passing through a curved section of the path.

The robot 100 may hold an object, such as a tray carrying the workpiece W, instead of directly holding the workpiece W to transfer.

The hand body 32 of the robot hand 3 may be integrally formed with the top plate 42 of the tilter 4.

The tilter 4 may be arranged between the base 1 and the lifting shaft 11, or between the lifting shaft 11 and the first arm 21, or between the first arm 21 and the second arm 22.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

In view of the foregoing teachings, it is clear that the present disclosure may take many modified and variant forms. Therefore, it is to be understood that the present disclosure may be practiced in a manner other than that described herein, within the scope of the appended claims.

The invention claimed is:

1. A robot that transfers a workpiece, the robot comprising:

an arm;

a hand installed to the arm, the hand including a front side and a back side, and the hand holds the workpiece on a top side of the hand and transfers the workpiece;

a tilter installed between the arm and the hand, wherein the tilter tilts an orientation of the hand relative to the arm without tilting an orientation of the arm, the tilter comprises a bottom plate fixed relative to the arm. a top plate supporting the hand, and a height adjuster located between the bottom plate and the top plate, the height adjuster comprises three supports arranged at non-collinear positions between the bottom plate and the top plate, the three supports including a first support, a second support, and a third support, heights of the first support and the second support are independently adjustable to change an angle and a direction of a tilt of the top plate with respect to the bottom plate, and the third support has a fixed height; and a hand orientation controller configured to control the tilter to tilt the orientation of the hand when an acceleration is produced in the hand during a process of holding and transferring the workpiece by the hand so that the back side, with respect to a direction of a horizontal component of the acceleration, is higher than the front side, and tilt the orientation of the hand to absorb a centrifugal force when the hand transfers the workpiece at a constant speed along a curved path.

2. The robot according to claim 1, wherein the hand orientation controller controls the tilter to increase a tilt of the orientation of the hand when the horizontal component of the acceleration produced in the hand is increased, and the hand orientation controller controls the tilter to decrease the tilt of the orientation of the hand when the horizontal component of the acceleration produced in the hand is decreased.

3. The robot according to claim 1, wherein, when the workpiece is transferred from a first point to a second point different from the first point in a plan view:

the hand orientation controller controls the tilter to tilt the orientation of the hand so that the back side of the hand with respect to a direction of transfer becomes higher than the front side at a moment immediately after the hand starts transferring the workpiece from the first point, and the hand orientation controller controls the tilter to tilt the orientation of the hand so that the front side of the hand with respect to the direction of transfer becomes higher than the back side at a moment immediately before the workpiece reaches the second point.

4. The robot according to claim 1, wherein the hand acts only on a bottom surface of the workpiece to hold the workpiece on the top side of the hand.

5. The robot according to claim 1, wherein the hand acts only on a bottom surface of the workpiece via one or more guide members to hold the workpiece on the top side of the hand.

6. The robot according to claim 5, wherein the guide members comprise rubber.

7. The robot according to claim 1, wherein the hand comprises a hand body comprising a first finger and a second finger defining a distal portion thereof.

8. The robot according to claim 1, wherein the arm is a horizontal articulated robot arm comprising a first arm and a second arm, the hand being installed to the second arm.

9. The robot according to claim 8, further comprising a lifting shaft installed between a base and the first arm, the lifting shaft configured to move the arm in a vertical direction.

10. The robot according to claim 1, further comprising a spherical bearing located between the height adjuster and the top plate.

11. The robot according to claim 1, wherein the hand orientation controller acquires a coefficient of friction associated with the workpiece and adjusts an amount of tilt based on the coefficient of friction.

12. The robot according to claim 1, wherein the workpiece is a semiconductor wafer or a printed circuit board.

13. The robot according to claim 1, wherein the hand comprises a wrist, and the tilter is installed between the arm and the wrist.

14. The robot according to claim 1, wherein the hand orientation controller comprises a processor and a memory storing instructions executable by the processor to perform the tilting operations.

15. A workpiece transfer method for a robot that transfers a workpiece, the robot including an arm, a hand installed to the arm, and a tilter installed between the arm and the hand, the tilter tilts an orientation of the hand relative to the arm without tilting an orientation of the arm, the hand including a front side and a back side, and the hand holding the workpiece on a top side of the hand and transferring the workpiece, the workpiece transfer method comprising:

tilting, with the tilter, the orientation of the hand when an acceleration is produced in the hand during a process of holding and transferring the workpiece by the hand so that the back side, with respect to a direction of a horizontal component of the acceleration, is higher than the front side, and tilting, with the tilter, the orientation of the hand to absorb a centrifugal force when the hand transfers the workpiece at a constant speed along a curved path, wherein the tilter comprises a bottom plate fixed relative to the arm, a top plate supporting the hand, and a height adjuster located between the bottom plate and the top plate, the height adjuster comprises three supports arranged at non-collinear positions between the bottom plate and the top plate, the three supports including a first support, a second support, and a third support, heights of the first support and the second support are independently adjustable to change an angle and a direction of a tilt of the top plate with respect to the bottom plate, and the third support has a fixed height.

16. A robot that transfers a workpiece, the robot comprising:

an arm;

a hand installed to the arm, the hand including a front side and a back side, and the hand holds the workpiece on a top side of the hand and transfers the workpiece;

a tilter installed between the arm and the hand, wherein the tilter tilts an orientation of the hand relative to the arm without tilting an orientation of the arm, the tilter comprises a bottom plate fixed relative to the arm, a top plate supporting the hand, and a height adjuster located between the bottom plate and the top plate, the height adjuster comprises three supports arranged at non-collinear positions between the bottom plate and the top plate, the three supports including a first support, a second support, and a third support, heights of the first support and the second support are independently adjustable to change an angle and a direction of a tilt of the top plate with respect to the bottom plate, and the third support has a fixed height; and a hand orientation controller configured to control the tilter to tilt the orientation of the hand when an acceleration is produced in the hand during a process of holding and transferring the workpiece by the hand so that the front side, with respect to a direction of a horizontal component of the acceleration, is higher than the back side; and tilt the orientation of the hand to absorb a centrifugal force when the hand transfers the workpiece at a constant speed along a curved path.

17. A workpiece transfer method for a robot that transfers a workpiece, the robot including an arm, a hand installed to the arm, and a tilter installed between the arm and the hand, the tilter tilts an orientation of the hand relative to the arm without tilting an orientation of the arm, the hand including a front side and a back side, and the hand holding the workpiece on a top side of the hand and transferring the workpiece, the workpiece transfer method comprising:

tilting, with the tilter, the orientation of the hand when an acceleration is produced in the hand during a process of holding and transferring the workpiece by the hand so that the front side, with respect to a direction of a horizontal component of the acceleration, is higher than the back side; and tilting, with the tilter, the orientation of the hand to absorb a centrifugal force when the hand transfers the workpiece at a constant speed along a curved path, wherein the tilter comprises a bottom plate fixed relative to the arm, a top plate supporting the hand, and a height adjuster located between the bottom plate and the top plate, the height adjuster comprises three supports arranged at non-collinear positions between the bottom plate and the top plate, the three supports including a first support, a second support. and a third support, heights of the first support and the second support are independently adjustable to change an angle and a direction of a tilt of the top plate with respect to the bottom plate, and the third support has a fixed height.

* * * * *